Dec. 28, 1965   M. HAYOT   3,225,803
CRUSHING MACHINE FOR SUGAR-CANE STALKS
Filed Nov. 15, 1963   3 Sheets-Sheet 1

INVENTOR
MARCEL HAYOT
By Irvin S. Thompson
ATTY

Dec. 28, 1965 M. HAYOT 3,225,803
CRUSHING MACHINE FOR SUGAR-CANE STALKS
Filed Nov. 15, 1963 3 Sheets-Sheet 2
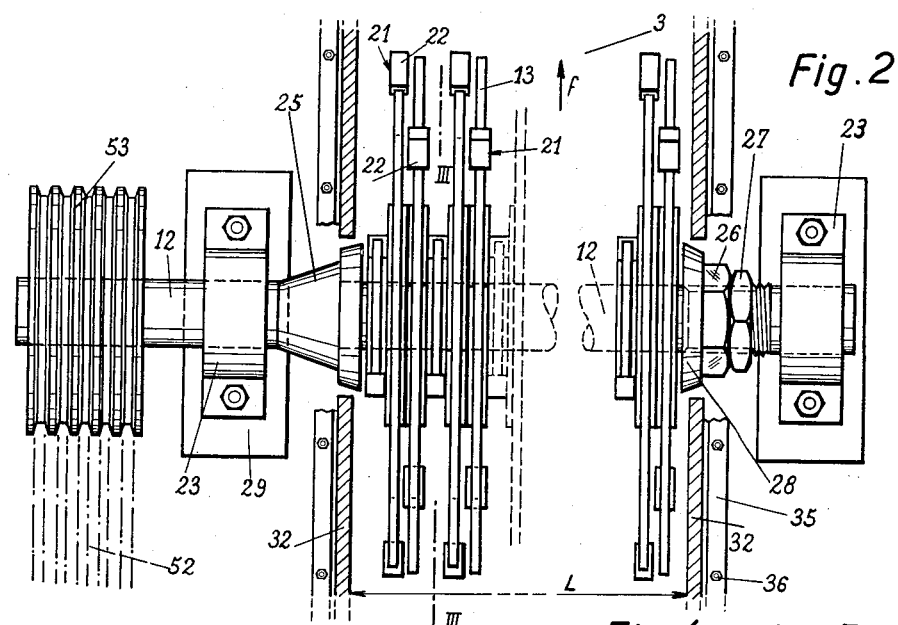
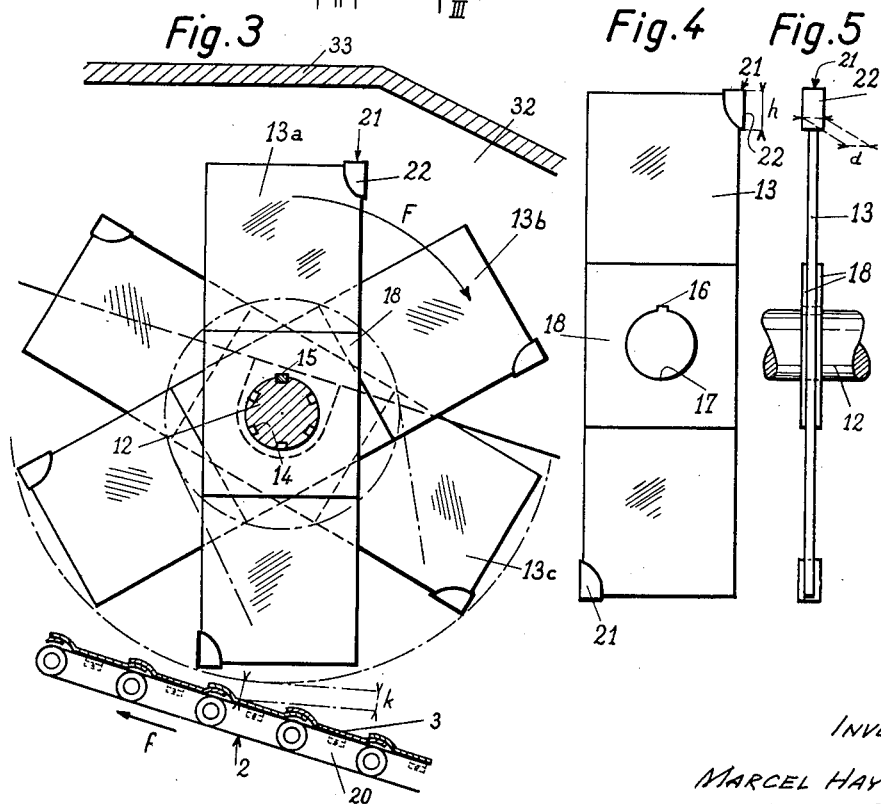
INVENTOR
MARCEL HAYOT
ATTY.

Dec. 28, 1965  M. HAYOT  3,225,803
CRUSHING MACHINE FOR SUGAR-CANE STALKS
Filed Nov. 15, 1963  3 Sheets-Sheet 3

INVENTOR
MARCEL HAYOT
By Irwin S. Thompson
ATTY.

United States Patent Office 3,225,803
Patented Dec. 28, 1965

3,225,803
CRUSHING MACHINE FOR SUGAR-CANE STALKS
Marcel Hayot, Basse-Pointe, Martinique, West Indies
Filed Nov. 15, 1963, Ser. No. 324,052
Claims priority, application France, Jan. 11, 1963,
921,087, Patent 1,353,017
7 Claims. (Cl. 146—119)

The present invention relates to a sugar-cane preparing machine of the type comprising rotary hammers.

The so-called sugar-cane preparers are machines which are placed at the head of a line of sugar-cane rolling mills and which shred the stalks so as to facilitate the subsequent gripping and "grinding" of the stalks by the mills.

It is known practice to make provision on the upstream side of the mills for machines fitted with rotary cutters and referred to as cane-cutters. These machines, which usually rotate at a speed ranging from 500 to 600 revolutions per minute, cut the cane into sections which are a few centimetres in length when the stalks are taken cross-wise but which are much longer if the stalks are presented lengthwise. The stalks which are cut in this manner afford a very poor grip for the rolls of the milling machinery and frequently give rise to clogging, which has to be overcome by making use of force feed systems of more or less complicated design.

One object of the present invention is to overcome the disadvantages referred to above by allowing the stalks to be reduced to a pulp, the consistency of which is such that it can readily be ground by the mills with high efficiency.

Among the cane-preparing machines of the rotary hammer type, the shredders are essentially known. These machines comprise a rotor which is located inside a thick metallic casing, the base of which is constituted by a grid disposed along a spherical surface which partially surrounds the rotor. The said rotor is made up of a stack co-axial discs. Each disc is provided with grinding arms of constant thickness known as hammers which are parallel to the plane of the periphery of said disc and which are pivotally secured to the periphery of this latter. Six separate arms are as a rule secured to each disc. The rotor is driven at high speed and is fed with stalks from a hopper which is located at the top of the rotor housing. The stalks are projected by the grinding arms against the bars of the grid and are thus broken up. The shredded fibres of the stalks pass through the bars and are collected on a conveyor which transfers said fibres to the first mill of the battery. Machines of this type are widely employed in the sugar-cane industry. However, they are attended by a fairly large number of practical disadvantages.

In the first place, the cost of shredding machines is high and the installations required are complex and call for a heavy capital outlay. One of the objects of the invention accordingly consists in overcoming this drawback by means of an inexpensive apparatus which can be readily mounted on existing installation.

A further disadvantage of shredders consists in the fact that the density of the sugar-cane pulp obtained is not very high, with the result that the production capacity of the mills is adversely affected. The invention also has for its object to obtain a sugar-cane pulp having a density which is higher than that which is produced by shredders and, in a more general manner, to improve the quality of the sugar-cane pulp which is produced prior to its delivery to the mills.

Shredders are subject to another drawback in that they have a heavy power consumption. Accordingly, a further object of the invention is to provide a remedy for this unfavourable condition.

Yet another defect of shredders is the fragility of these machines. In the first place, the articulated arms are liable to break off as a result of wear of the bearings, which is liable to damage the machine and even cause accidents. Moreover, should a foreign metallic body be present in the cane (which frequently occurs), the shredder is very seriously damaged. The present invention is also intended to provide a remedy for such additional disadvantages.

Further objects of the invention will be brought out by the description which follows below.

In accordance with the present invention, the crushing machine of the type which is designed for the preparation of sugar-cane so as to convert into pulp uncut stalks which are conveyed to a crushing mill by means of a metallic apron conveyor, is mainly characterized in that it comprises a rotor which is constituted by a shaft mounted in bearings and placed above the conveyor apron in parallel relation to this latter and at right angles to its direction of motion, said rotor comprising an assembly of non-juxtaposed blades mounted at right angles to the aforesaid shaft and made fast for rotation with this latter, said blades being displaced angularly with respect to each other, percussion masses having a width which is greater than the thickness of said blades fitted at the extremity of each blade on the leading edge thereof relative to the direction of rotation, said percussion masses being designed to follow paths which pass at a small distance above the conveyor apron in such manner as to strike the mass of stalks which is conveyed by said apron, said machine further comprising a motor for the purpose of causing the aforesaid rotor to rotate at high speed during the displacement of the conveyor, the direction of rotation being such that the direction of tangential motion of the masses rotating in proximity to the conveyor is the same as the direction of movement of said conveyor.

Preferably, the rotary blades are separated by packing-pieces and the percussion masses which are carried by said blades extend laterally inside the space which is formed by said packing-pieces.

According to an advantageous form of embodiment of the invention, the rotor blades are made up of thick metallic plates of rectangular configuration, the percussion masses being fitted on two of the diagonally opposite vertices of the rectangle and on the same side as the leading edge of this latter.

Experience has shown, moveover, that the best results are obtained when the percussion masses have a flat active face which is substantially perpendicular to the direction of peripheral movement of said masses.

In practice, the linear speed of the percussion masses is substantially comprised within the range of 2,800 to 3,200 metres per minute. The percussion surface of each mass can be 4.0 x 8.0 millimeters, and the rotor unit can weight from 1 to 3 metric tons depending on size.

A remarkable result shown by practical experimentation is that the machine in accordance with the invention makes it possible to disintegrate the stalks and to reduce these latter to pulp without loss of juice. In addition, the pulp which is thus obtained is more closely interlaced (thereby improving the gripping action of the mill) and is more compact than the pulp which is produced by a conventional shredder. This latter feature increases the grinding capacity of the mill.

Further characteristic features of the invention will be brought out by the description which follows below, reference being made therein to the accompanying drawings, which illustrate diagrammatically and solely by way of example, without implied limitation a number of different forms of embodiment of the invention.

FIG. 2 is a plan view of the crusher on a larger scale and taken along line II—II of FIG. 1.

FIG. 3 is a view in elevation and in cross-section taken along the line III—III of FIG. 2.

FIG. 4 is a front view of a single blade of the crusher.

FIG. 5 is a view in profile of the same crusher blade mounted on the rotary shaft.

Figure 1:
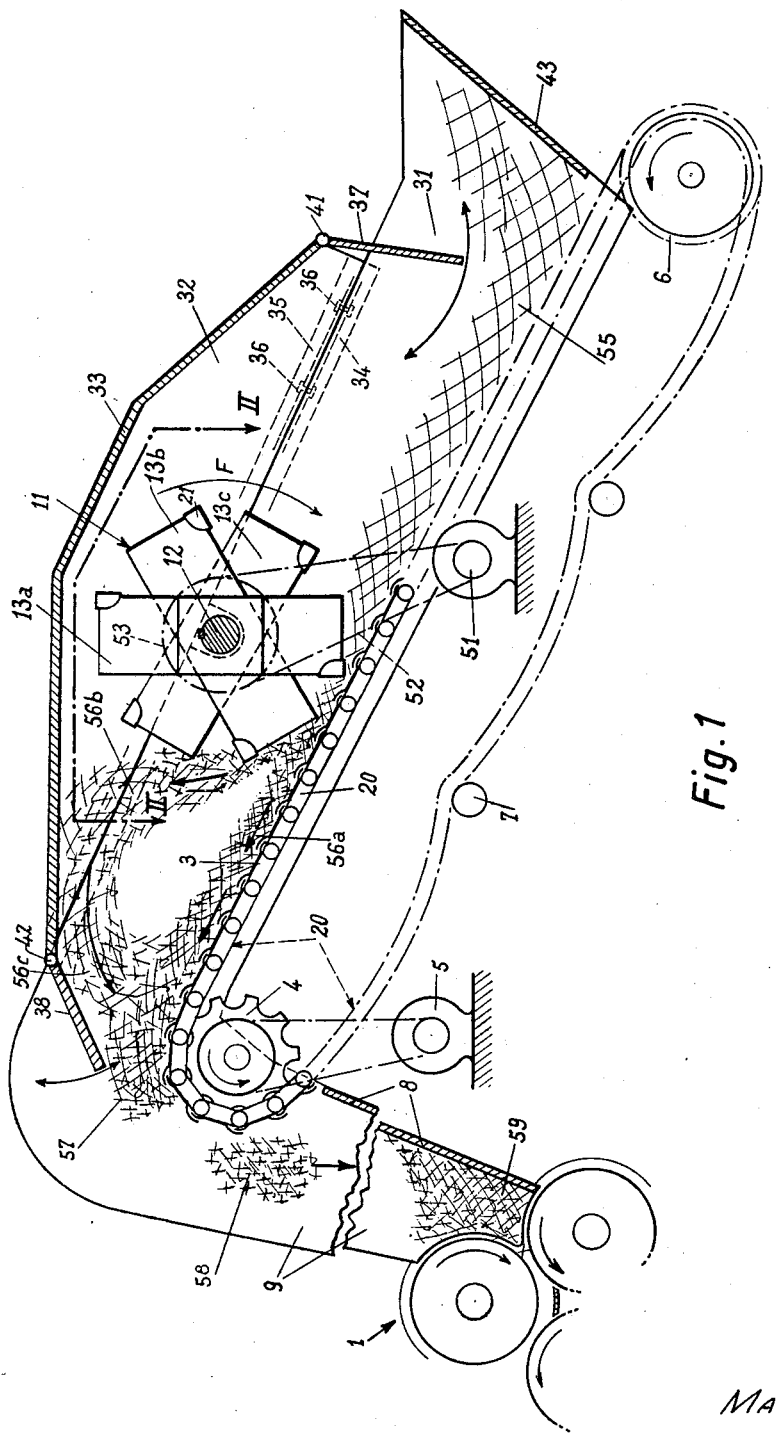
FIG. 1 is a view on a small scale in elevation and in cross-section with parts broken away taken along a diametral plane, showing an installation which is provided with a crusher in accordance with the invention.

The constructional assembly which is illustrated in FIG. 1 shows the application of the invention to a small-capacity installation, in which there can be seen the head mill 1 consisting of a set of three rolls.

The feed apparatus which is provided for this mill consists of a conveyor 2 fitted with a metallic apron formed by pans 3 having rounded longitudinal edges and disposed in such manner as to overlap each other (as shown in FIG. 3).

An apron conveyor of this type is well-known per se in the sugar-cane industry. The pans 3 are secured to the side-chains 20 of the conveyor which engage over downstream sprockets 4 driven from a motor 5 and over upstream idler sprockets 6 with respect to the direction $f$ of active displacement of the conveyor. As the conveyor returns along the bottom run, the chains which carry the apron 3 pass over tension rollers 7. The apron 3 of the conveyor is upwardly inclined in the direction $f$. The apron supplies a chute 8 which is downwardly inclined at a sharp angle and terminates at the intake of the mill 1. The chute 8 is provided with sheet metal retaining sides 9.

The arrangement which has been described above is already known per se.

In accordance with the invention, provision is made above the conveyor 2 for a rotary crusher 11 which is constructed as follows:

On a same cross-shaft 12, there is mounted a unit composed of rigid blades 13a, 13b, 13c, which extend from end to end of the shaft 12 and project radially therefrom and which are displaced angularly with respect to each other, the assembly of these blades constituting a rotary unit or rotor of rigid structure.

In the embodiment described, the different blades 13 are angularly offset relatively to each other through an angle of 60°. The said blades can advantageously be constituted by rectangular steel plates of relatively substantial thickness (15 to 20 mm., for example).

Means are provided whereby the blades 13 are all keyed angularly with respect to the shaft 12. Accordingly, the said shaft can be provided with keyways 14 (as shown in FIG. 3), each blade being secured by means of a detachable key 15 which is engaged with a slot 16 (as shown in FIG. 4), said slot being formed in the central hole 17 of said blade.

Lateral spacer members form a clearance between the different blades. In the example considered, said spacer members are constituted by packing-pieces or shims 18 consisting of plates which are secured by welding to the central portion of each blade 13, for example on each side of said blade. Accordingly, the thickness of each blade 13 at the level of the shaft 12 can range from 35 to 40 millimetres (including the thickness of the packing pieces 18).

In the form of embodiment which is considered, the blades 13 have a rectangular configuration and are fitted at two diagonally opposite vertices thereof with percussion masses 21. Preferably, said masses consist of added tips of hard metal (hardened steel) having the shape of right-angled corner-caps which are adapted to fit over the angular portions of the blades. The masses 21 can be arc-welded onto said blades.

The percussion masses 21 have a flat active face 22 which corresponds to the leading front portion of the corner-cap relatively to the direction of rotation F in which the rotor 11 is intended to be driven. This direction F is such that the direction of tangential movement of that portion of the blades 13 which is located in proximity to the apron 3 is the same as the direction $f$ of translational motion of the conveyor 2.

As a preferable arrangement, the masses 22 extend laterally beyond the blade 13 on which they are mounted and the width $d$ of each mass (as shown in FIG. 5) is such that the annular volume which is swept by a percussion mass 22 must be contiguous to both annular volumes swept by the adjacent masses, while there must not be either overlapping or clearance between these volumes.

In the case, for example, in which the blades 13 have a total length of 1 metre (which corresponds to two arms each having a length of 50 centimetres), each percussion mass can have a width $d$ of 25 to 40 millimetres and a height $h$ of 80 millimetres.

The combined assembly of blades 13 of the crusher 11 extends transversely over a length which corresponds practically to the width L (as shown in FIG. 2) of the conveyor as measured between the side walls 31 of this latter. In the case, for example, in which a conveyor is employed which has a width of 1.2 metres, provision can accordingly be made for 22 consecutive arms, which represents 44 percussion masses.

After having been fitted onto the shaft 12, the assembly unit which is formed by the blades 13 is secured thereto in the following manner:

The stack of blades is applied at one end against an abutment shoulder 25 which is formed by an enlarged portion of the shaft 12. The system of clamping which is provided at the other end of said shaft comprises a nut 26 and lock-nut 27, whilst the thrust of these members is applied against the combined assembly of blades by means of a washer 28.

The rotor as thus constituted is mounted above the conveyor at a distance $k$ from the conveyor apron 3 which is as small as possible. For example, the distance $k$ is comprised between 1 and 2 centimetres (FIG. 3). The erecting operation is carried out by fitting the ends of the shaft 12 in bearings 23 which are in turn supported on columns 29 which can be either metallic or of concrete, for example, and which are located on each side of the conveyor 2.

The driving system which is provided for the crusher 11 consists of an electric motor 51 which is operatively connected by means of drive belts 52 to a multiple-groove pulley 53 (as shown in FIG. 2) which is keyed to the extremity of the shaft 12. The power of the motor 51 must be so calculated that said motor is capable of driving the crusher rotor at a speed of approximately 900 to 1000 revolutions per minute during operation, which corresponds substantially to a power capacity of 2 to 4 H.P. per ton of cane and per hour depending on the designed conditions of operation.

The crushing machine which is contemplated by the present invention is additionally provided with protecting side-walls 32 and with walls 33 which surround the rotor constituted by the set of blades 13.

The side walls 32 which are fabricated, for example, of sheet metal are joined to the retaining walls 31 of the conveyor by means of adjacent angle-iron members 34, 35 which are joined together by means of clamping bolts 36.

The top walls 33 are preferably constituted by steel sheets of substantial thickness, inasmuch as said walls play a part in the operation of the crusher in a manner which will be explained below, the broken-line contour of said walls being conditioned by this operation. The walls 33 are completed by an upstream flap 37 and by a terminal downstream flap 38, said flaps being pivoted respectively about hinge-pins 41 and 42. Further provision is made on the upstream or input side of the flap 37 for an oblique wall 43 which serves as a hopper.

The operation is as follows:

The hopper 43 is supplied from any suitable feed apparatus with uncut stalks 55 having a length of 1 to 2 metres, for example. The stalks are brought by the conveyor 2 (driven, for example, at a speed of 5 to 20 metres per minute) beneath the crusher 11 which is assumed to be in motion. At this moment, the stalks are struck by the combined assembly of percussion masses 21 which are fixed on the blades 13. The said masses rotate substantially at a speed within the range of 2800 to 3200 metres per minute and, at the moment of impact with a stalk, reduce this latter to fragments and throw it forward. By reason of the shape which is adopted for the active faces 22 of the percussion masses 21, the stalks are crushed flat as they are struck. Furthermore, if the rotor speed is sufficient, each section of stalk can be beaten twice in succession by the masses of a same blade prior to being projected forward, which is highly conducive to effective fragmentation of the stalk.

It has been found as a result of experience that the pulp which is produced after beating of the stalks is substantially split up into two streams: one stream 56a which forms a layer of pulp on the conveyor and one stream 56b which is directed towards the top protecting wall 33 of the crusher. The stream 56b is thrown up against the wall 33 and deflected therefrom so as to return downwards in a sheet along 56c towards the top terminal portion of the conveyor 2, thus permitting the formation of a thick layer 57 of pulp, the depth of this layer being made substantially uniform by virtue of the pressure applied thereon by the hinged flap 38.

The two substantially perpendicular paths 56a, 56c produce an intermingling of the pulp at the level of the layer 57. This characteristic process is very useful for the purpose of increasing the compactness and density of the pulp which is finally obtained.

It is of particular advantage to ensure that the stalks are reduced to a state of pulp without expression of juice. Accordingly, it is not necessary to make provision alongside the conveyor 2 for troughs or the like for the purpose of recovering juice.

The advantageous result noted above can be explained in the following manner, without nevertheless strictly binding the invention to said explanation: the entire surface of the conveyor which is located beneath the rotary crusher 11 is swept by the percussion masses 22 approximately 2000 times per minute when the crusher is rotating at normal running speed.

The result thus achieved is a very fractional treatment of the stalks as essentially performed by direct percussion or beating action without compression or tearing against stationary grids as is the case with shredders. On the other hand, the percussive force for an equal rotating mass is much greater than in the case of a shredder by reason of the fact that, in the case of the present invention, the entire mass of the rotor takes part in the beating action on account of the absence of any articulation between the masses 22 and the shaft 12. Moreover, in view of the fact that the disintegrated stalks are liable to escape from the rotor tangentially, their components in the direction of the conveyor 2 are very small, with the result that said conveyor is not subject to wear as a result of the work performed by the crusher. Wear of the crusher itself is also very slight. Experience has shown that the masses 22 are capable of withstanding at least one milling campaign (working period of 90 days) and as a rule two without requiring to be built-up.

A further noteworthy feature is that the power which is consumed by the machine is very low since it is scarcely higher than that consumed by a cane-cutter. Moreover, overloads in the supply of material from the conveyor 2 do not result in any substantial increase in momentary power consumption.

In the terminal portion of the conveyor 2, lumps of pulp 58 (as shown in FIG. 1) are successively detached as a result of the movement of said conveyor. The lumps 58 which are closely grouped together fall into the chute 8 and form a heap 59 at the intake of the mill 1. This heap of pulp has the requisite compactness in order to permit of better gripping action of the mill 1. The gripping action referred to is rendered even more effective by the periodic falling of the lumps 58. On the basis of the quantitative characteristics which have been set forth above, experience has shown that the weight of sugar-cane which it is possible to process is of the order of 60 tons per hour.

Experience has also revealed that the machine is not damaged by the passing of small metallic objects. In addition, the upkeep of the machine is highly simplified since the machine does not comprise any articulation or gridwork which has to be checked. It is very easy to keep the machine in a clean condition and there is never any danger of accidentally occurring fermentation owing to the fact that the blades are self-cleaning under the action of centrifugal force and owing to the fact that there is no grid.

Figure 6:
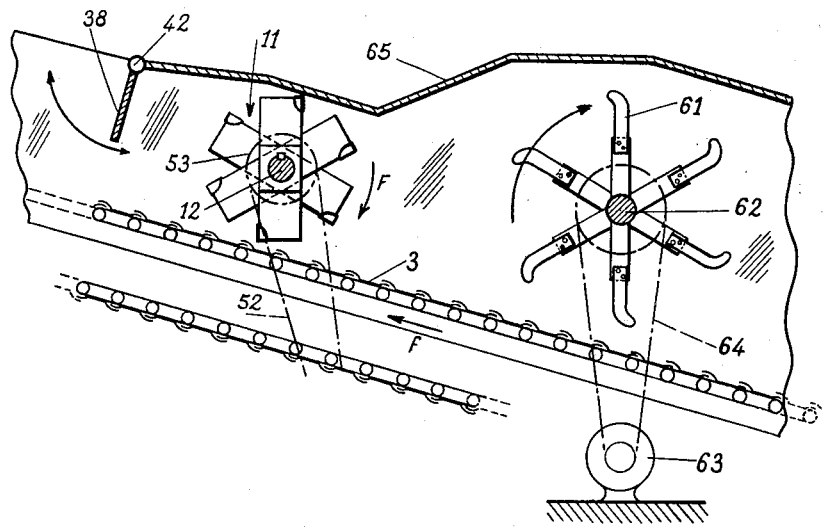
FIG. 6 is a partial diagrammatic view in elevation similar to FIG. 1, showing an alternative form of installation in accordance with the invention.

The installation of FIG. 1, in which the crusher 11 is employed alone above the apron conveyor and directly transforms sugar-cane stalks of appreciable length, is particularly suited to low-capacity units. In the case of a unit of larger capacity, it is advisable to make use of the crusher 11 at the output end of a cane-cutter. An installation of this kind has been illustrated diagrammatically in FIG. 6 in which there can be seen at 61 the slightly arcuate cutting-knives of the cane-cutter. These cutting-knives or cutters are mounted on a shaft 62 and driven from a motor by means of a drive system 64. The speed of rotation of the rotor which is thus constituted is of the order of 500 to 600 revolutions per minute.

In the form of embodiment considered, the two rotary devices are covered by a single wall 65 of thick steel sheet which serves both for protection purposes and for the purpose of deflecting towards the apron 3 the stalks which have been disintegrated or finely divided. It has been found as a result of practical experience that an installation of this kind makes it possible to reduce by 25 to 40% approximately the power which is required at the motor 51 for the purpose of driving the crusher at the appropriate speed as compared with the form of embodiment of FIG. 1 in which the crusher is employed alone.

Other modes of assembly can be adopted for the location of the crusher 11.

Figure 7:
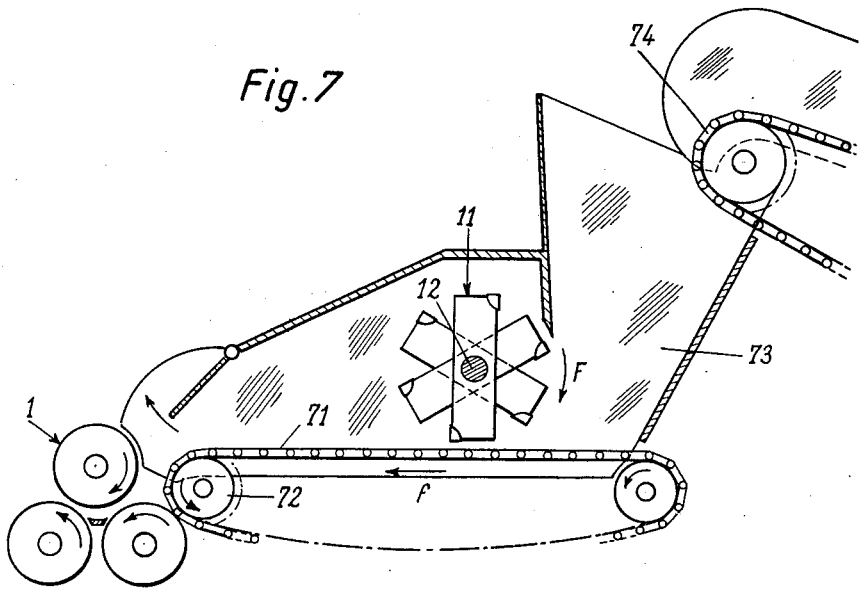
FIG. 7 is a diagrammatic view in elevation of another alternative form of installation.

In the embodiment of FIG. 7, the crusher is mounted above a chain-conveyor 71, the apron of which is horizontal and the downstream roller 72 of which occupies relative to the mill 1 the position of the usual feed roller. The crusher 11 is disposed above the conveyor 71 as in the previous versions. At the input end of said crusher as determined by the direction f of the conveyor, provision is made for a hopper 73 which is supplied by another conveyor 74 with stalks which have already passed beneath a cane-cutter, not shown, which is disposed above the conveyor 74.

The pulp which is produced by the crusher 11 is thus directly brought into the inlet opening of the mill 1 by means of the roller 72 which plays the part of a feed roller.

It will thus be seen that the invention provides for the development of a device which is easy to construct and which requires only very little maintenance. This device makes it possible to carry out a specific form of treatment of sugar-cane stalks (disintegration by percussion) which ensures better initial processing by the mills, which permits an increase in the juice expressed by these latter and which also permits of a reduction in the driving power required.

What I claim is:

1. Crushing machine for processing sugar-cane in stalks in order to convert said stalks into pulp, said machine being located ahead of the head mill of a line of sugar cane rolling mills, said head mill being fed with cane by an apron carrier, said machine comprising a shaft rotatably fitted above said apron carrier in a direction transverse thereto, means to rotate said shaft in a direction corresponding to the feeding movement of said carrier, an assembly of rigid blades perpendicularly secured to said shaft and substantially radially projecting therefrom, each blade projecting in two opposite directions, and the directions of said blades being angularly offset with respect to each other, corner caps fitted at the extremity of each of said blades, on the same side as the leading edges thereof with respect to the rotating direction of said blades, said corner caps having flat front surfaces facing the forward movement of said blades and laterally projecting beyond said blades, there being a free passage of at most a few centimetres between said apron carrier and the rotor constituted by said blades assembly.

2. Crushing machine for processing sugar cane in stalks in order to convert said stalks into pulp, said machine being located ahead of the head mill of a line of sugar cane rolling mills, said head mill being fed with cane by an apron carrier, said machine comprising a shaft rotatably fitted above said apron carrier in a direction transverse thereto, means to rotate said shaft in a direction corresponding to the feeding movement of said carrier, an assembly of rigid blades perpendicularly and rigidly secured to said shaft and substantially radially projecting therefrom, the directions of said blades being angularly offset with respect to each other, percussion masses fitted at the extremity of each of said blades on the same side as the leading edges thereof with respect to the rotating direction of said blades, said percussion masses having flat front surfaces facing the forward movement of said blades and laterally projecting beyond said blades, there being a free passage of at most a few centimeters between said apron carrier and the rotor constituted by said blades assembly.

3. Crushing machine as claimed in claim 2, and shims fitted between the portions of the successive blades adjacent the shaft and the thickness of which is substantially equal to the amount by which the percussion masses project beyond the blades.

4. Crushing machine as claimed in claim 2, said percussion masses comprising right-angled corner caps of hard metal secured to the leading edges of the outer edges of the blades.

5. Crushing machine as claimed in claim 2, in which the annular volume swept by each of said percussion mass front surfaces is substantially contiguous to both annular volumes swept by both of said front surfaces adjacent thereto.

6. Crushing machine as claimed in claim 2, and means to return toward said apron carrier the pulp particles upwardly projected by said percussion masses, said returning means comprising a top wall located above said percussion masses and extending above said apron carrier and being at an angle therewith.

7. Crushing machine as claimed in claim 6, wherein said returning means further comprise a terminal flap hinged on said top wall for vertical swinging movement about a horizontal axis and extending toward said apron carrier.

References Cited by the Examiner

UNITED STATES PATENTS

| | | | |
|---|---|---|---|
| 1,306,500 | 6/1919 | Rankin | 146—121 |
| 1,353,349 | 9/1920 | Krafft. | |
| 2,070,959 | 2/1937 | Smith | 146—119 X |
| 2,208,892 | 7/1940 | Bukacek | 241—197 |
| 2,860,475 | 11/1958 | Richard | 56—294 X |
| 3,101,759 | 8/1963 | Sterner et al. | 146—119 X |

ROBERT C. RIORDON, *Primary Examiner.*

J. SPENCER OVERHOLSER, *Examiner.*